United States Patent [19]

Faverino

[11] 4,199,186

[45] Apr. 22, 1980

[54] PORTABLE STOCK RACK FOR PICKUP TRUCK

[76] Inventor: Robert M. Faverino, Rte. 2, Box 85A, Ignacio, Colo. 81137

[21] Appl. No.: 868,508

[22] Filed: Jan. 11, 1978

[51] Int. Cl.² .............................................. B60P 3/04
[52] U.S. Cl. .................................... 296/13; 296/37.1; 296/50
[58] Field of Search ...................... 296/3, 7, 8, 10–13, 296/50, 51; 49/381, 383; 292/262, 271, 272; 211/178

[56] References Cited

U.S. PATENT DOCUMENTS

| | | | |
|---|---|---|---|
| 1,281,992 | 10/1918 | Meyer et al. | 296/52 |
| 3,600,032 | 8/1971 | Gross | 296/50 |

Primary Examiner—Richard A. Bertsch
Attorney, Agent, or Firm—Clarence A. O'Brien; Harvey B. Jacobson

[57] ABSTRACT

A pair of opposite side and front rack sections are provided for disposition in upstanding position extending along and projecting upwardly from the upper marginal edge portions of the side and front walls of the load bed of a pickup truck. The front section extends between and is secured to the forward ends of the opposite end sections and the side and front sections each include an extension supported therefrom for swinging about an axis paralleling the upper marginal edge of the corresponding section between a lowered inverted position disposed alongside and generally paralleling the corresponding section and a raised upright and upstanding upper position forming an upward extension of the corresponding section. The side and end section extensions are disposed along the outer and inner sides of the corresponding sections, respectively, when in the lowered inverted positions and the stock rack further includes a pair of opposite side partial end wall rack sections supported and projecting inwardly from the rear ends of the side sections toward each other and including horizontally spaced apart upstanding adjacent edge portions. A gate member is removably supported in positions spanning and closing the space between the adjacent edge portions of the partial end wall sections and each of the latter also includes an extension swingably supported therefrom corresponding to the side and end section extensions, the adjacent ends of adjacent extensions including coacting structure for stationary securement of the extensions to each other when in the upper positions thereof.

9 Claims, 6 Drawing Figures

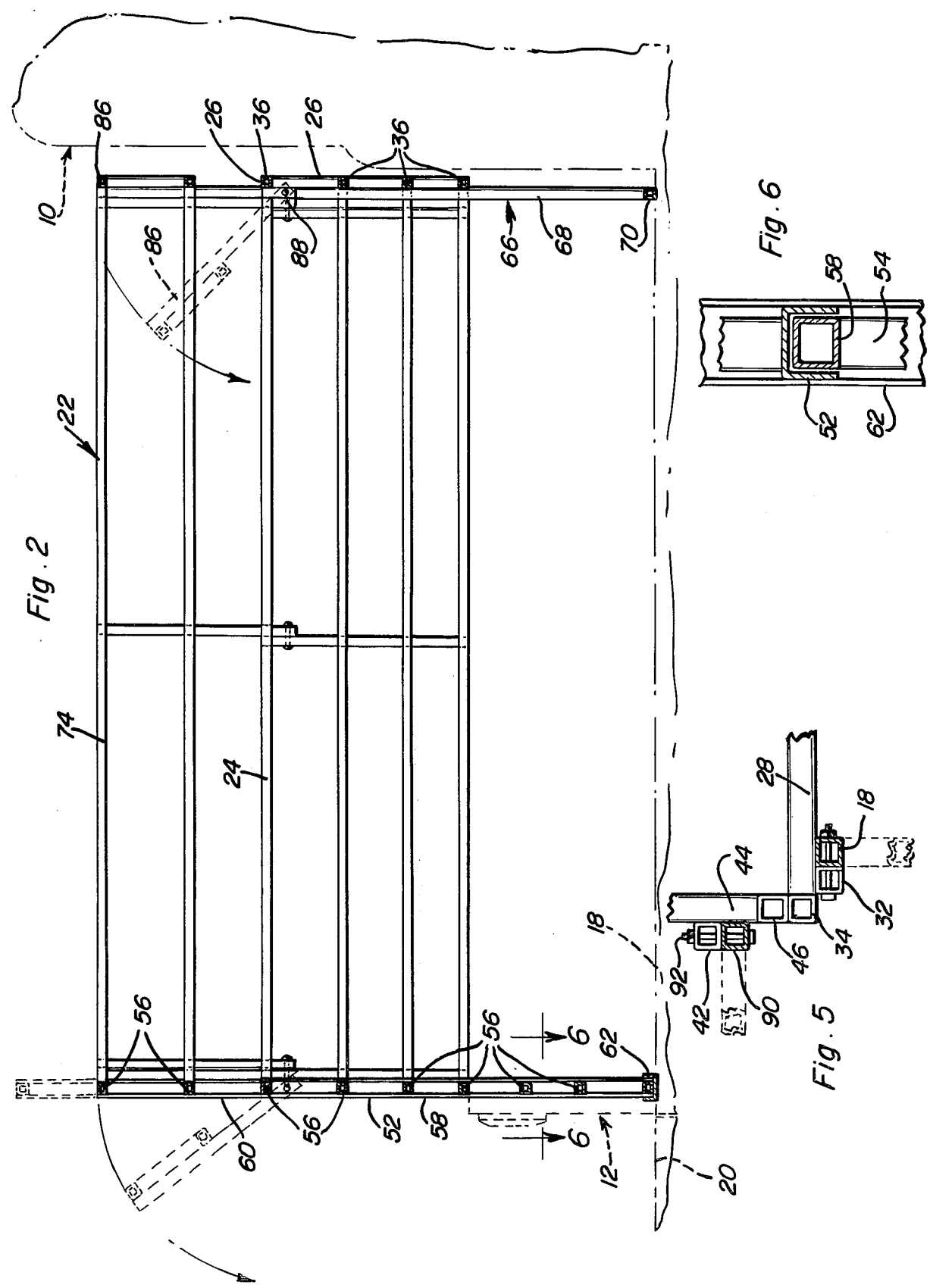

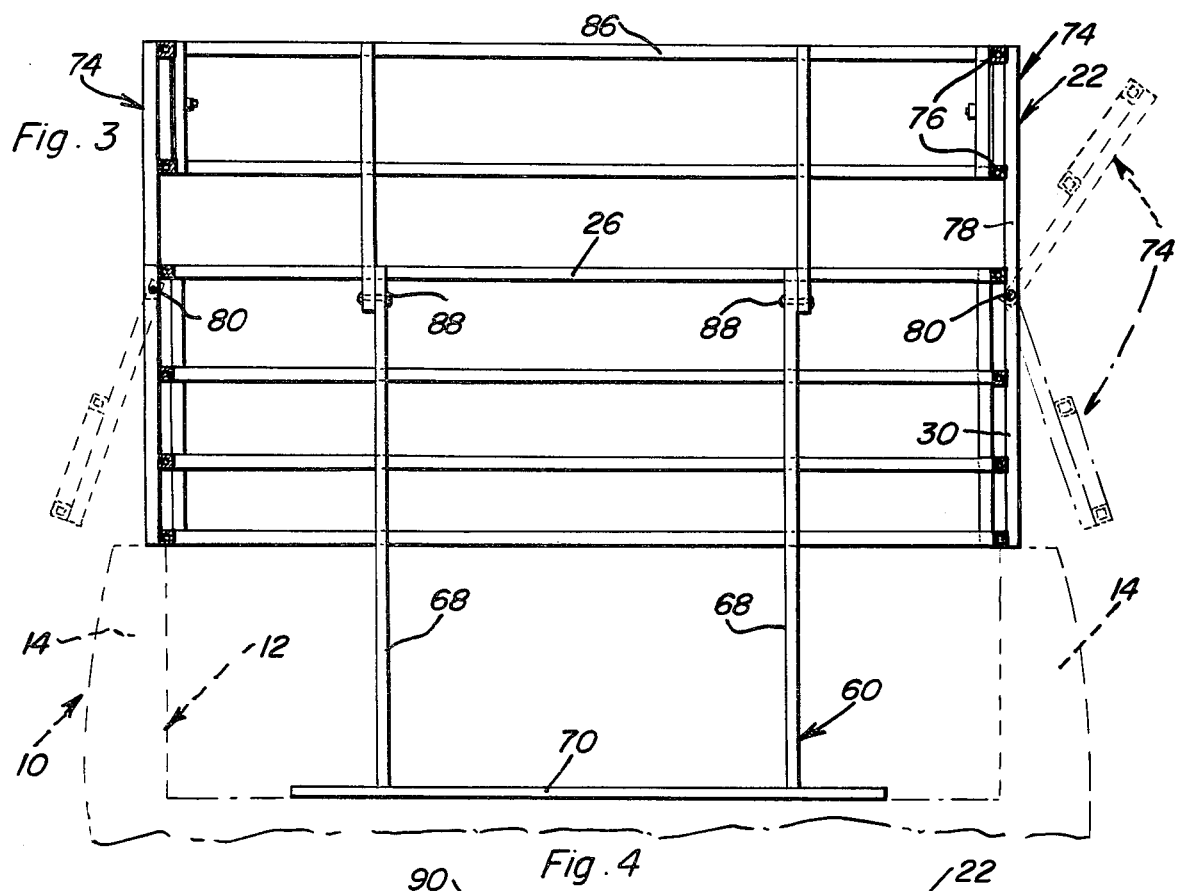
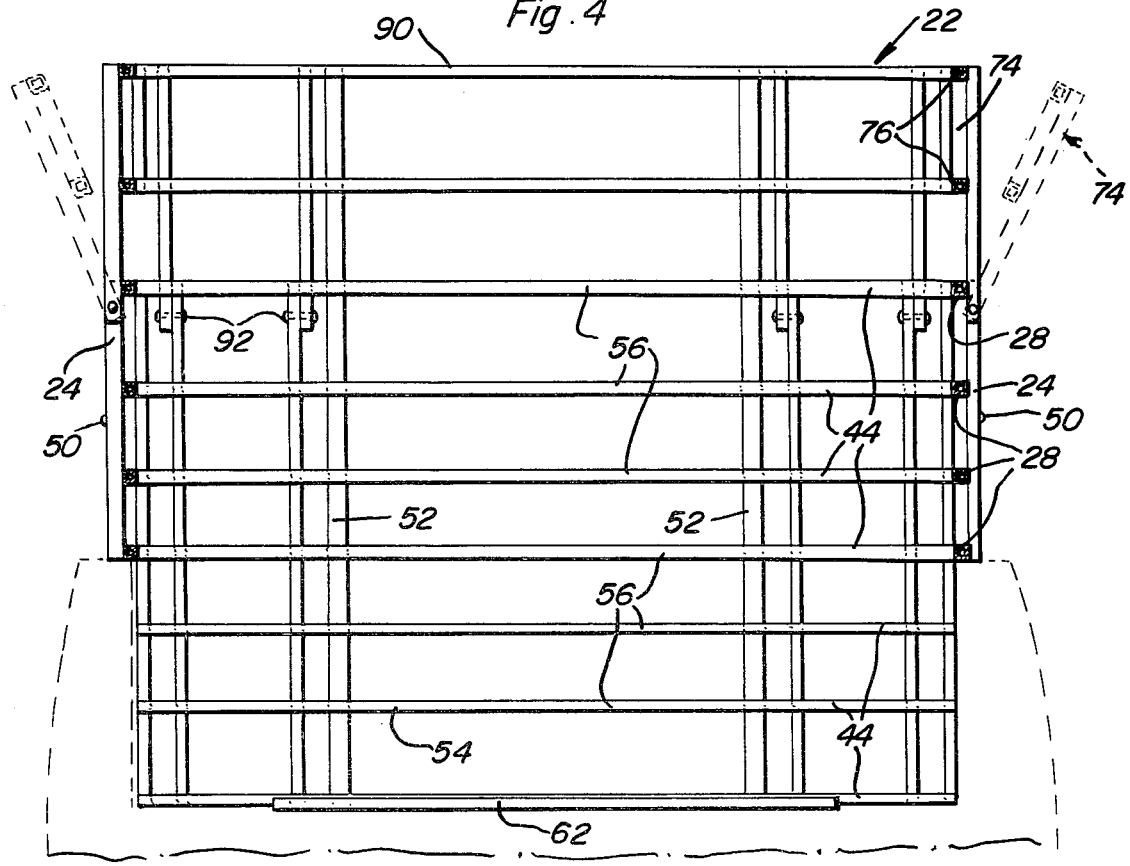

PORTABLE STOCK RACK FOR PICKUP TRUCK

BACKGROUND OF THE INVENTION

Various forms of stock racks have been heretofore provided for use on pickup trucks. However, in many instances, although a stock rack is desired, the associated pickup truck must pass under low overhead obstructions and the overall height of the stock rack must be limited in order to provide clearance for the pickup truck to move under such overhead obstructions. Further, in other instances, where low overhead obstructions are not anticipated, a relatively high stock rack is desired.

Accordingly, a need exists for a stock rack which may be mounted on a pickup truck and which may be extended upwardly and retracted downwardly as desired.

Various forms of racks for pickup trucks including non-extendable racks and extendable racks have been heretofore provided. Examples of several forms of stock racks including some of the general structural and operational features of the instance invention are disclosed in U.S. Pat. Nos. 1,533,475, 1,563,244, 2,801,130, 2,808,291 and 3,456,977.

BRIEF DESCRIPTION OF THE INVENTION

The portable stock rack of the instant invention is constructed in a manner whereby it may be readily mounted on and removed from a pickup truck with little effort. The stock rack is constructed whereby its height may be extended or retracted as desired and the rack is further constructed in a manner whereby it may be utilized in conjunction with the conventional pickup truck tailgate. In other instances, when it is desired to be afforded a maximum length stock rack, the length of the stock rack may be slightly increased and the conventional pickup truck tailgate may be removed. Further, the portable stock rack includes a center doorway for opening therethrough in the rear wall assembly thereof and the doorway is selectively closable by means of a vertically slidable door or gate.

The main object of this invention is to provide a stock rack for a pickup truck which may be readily mounted on and removed from a pickup truck.

Another important object of this invention is to provide a stock rack which may be readily extended and retracted in height.

Still another object of this invention is to provide a stock rack having a rear doorway therein and a readily openable closure for the doorway.

A further object of this invention is to provide a stock rack including structure at its front and rear ends adapted to engage the floor of the associated pickup truck load bed for substantial full support of the stock rack from the load bed floor as opposed to being supported from the upper marginal edge portions of the side and end walls of the load bed.

A final object of this invention to be specifically enumerated herein is to provide a stock rack in accordance with the preceding objects and which will conform to conventional forms of manufacture, be of simple construction and easy to use so as to provide a device which will be economically feasible, long lasting and relatively trouble free in operation.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is an enlarged longitudinal vertical sectional view taken substantially upon the plane indicated by the section line 2—2 of FIG. 1;

FIG. 3 is an enlarged transverse vertical sectional view taken substantially upon the plane indicated by the section line 3—3 of FIG. 1 and with partially downwardly retracted positions of the extensions of the stock rack illustrated in phantom lines;

FIG. 4 is an enlarged transverse vertical sectional view taken substantially upon the plane indicated by the section line 4—4 of FIG. 1;

FIG. 5 is a fragmentary enlarged horizontal sectional view taken substantially upon the plane indicated by the section line 5—5 of FIG. 1; and FIG. 6 is an enlarged fragmentary horizontal sectional view taken substantially upon the plane indicated by the section line 6—6 of FIG. 2.

DETAILED DESCRIPTION OF THE INVENTION

Figure 1:
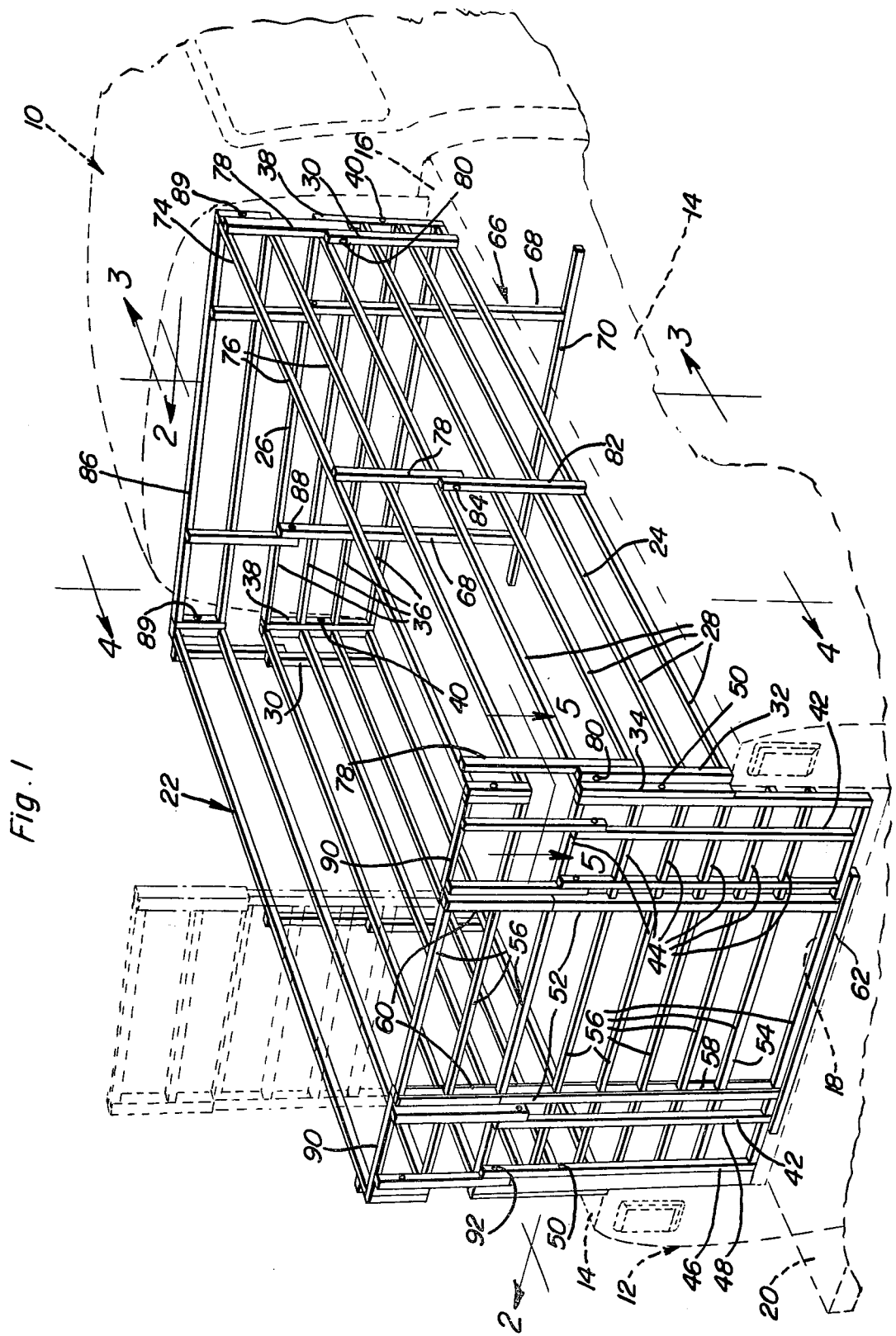
FIG. 1 is a perspective view of the stock rack of the instant invention operatively associated with the load bed of a pickup truck fragmentarily illustrated in phantom lines.

Referring now more specifically to the drawings, the numeral 10 generally designates a conventional form of pickup truck including a load bed referred to in general by the reference numeral 12 including upstanding opposite side walls 14 interconnected at their forward ends by means of an upstanding transverse front wall 16. The load bed 12 further includes a bottom wall 18 extending between and secured to the lower marginal portions of the side and end walls 14 and 16 and a vertically swingable tailgate 20 which may be swung between a lowered horizontal position and an upstanding closed position disposed between the rear ends of the side walls 14.

The stock rack of the instant invention is referred to in general by the reference numeral 22 and includes opposite side rack sections 24 and a front rack section 26. The side rack sections 24 include four vertically spaced horizontal members 28 of tubular construction and interconnected at corresponding ends by means of upstanding front and rear members 30 and 32. In addition, the rear ends of the side sections 24 include additional vertical members 34 for a purpose to be hereinafter more fully set forth. The front section 26 includes vertically spaced horizontal members 36 interconnected at corresponding ends by means of upstanding members 38 and fasteners 40 removaby secure adjacent ends of the sections 24 and 26 together and it will be noted that the sections 24 and 26 overlie the inner portions of the upper marginal edges of the side and end walls 14 and 16.

The rack 22 further includes partial end wall sections 42 including vertically spaced horizontal members 44 interconnected at corresponding ends by means of vertical members 46 and 48 and the partial end wall sections 42 project inwardly from the rear ends of the side sections 24 toward each other. Further, fasteners 50 are utilized to secure the partial end wall sections to the rear ends of the sections 24.

The adjacent horizontally spaced apart upstanding marginal portions of the partial end wall sections 42 include opposing upstanding channels 52 and a gate 54 including vertically spaced horizontal members 56 interconnected by means of vertical members 58 is provided and the vertical members 58 are slidingly received in the channels 52 whereby the gate 54 is vertically slidable from a lowered position closing the opening between the end wall sections 42 and a raised open position. The upper portions of the members 58 include channel members 60 corresponding to the channel members 52 and downwardly abuttingly engageable with the latter when the gate 54 is in its closed position. Further, an upwardly opening channel member 62 extends between and is secured to the lower ends of the partial end sections 42 and embracingly receives the lower horizontal member 56 of the gate 54 when the latter is in its closed position.

The front section 26 includes a depending support leg assembly referred to in general by the reference numeral 66 including a pair of depending legs 68 secured at their upper ends to corresponding opposite end portions of the horizontal members 36. The legs 68 depend downwardly below the section 26 and are interconnected at their lower ends by means of a horizontal member 70 abuttingly engaged with the forward portion of the floor 18. Further, the lower ends of the end sections 42 abut the opposite side portions of the rear marginal edge of the floor 18 and the channel member 62 abuts the rear marginal edge of the floor 18.

The sections 24 include extensions 74 including vertically spaced horizontal members 76 interconnected by means of opposite end and central vertical members 78 whose lower ends are pivotally anchored to the vertical members 30 and 32 by means of fasteners 80 and two central vertical members 82 of the sections 24 by means of fasteners 84. The vertical members 78 extend below the upper horizontal members 28 and are disposed on the outer sides thereof as are the vertical members 30 and 82. Further, the fasteners 80 and 84 are spaced below the uppermost horizontal members 28 a distance slightly greater than the distance the lower ends of the vertical members 78 project below the fasteners 80 and 84. Accordingly, the inner sides of the lower ends of the vertical members 78 abut the outer sides of the upper horizontal members 28 to limit swinging movement of the extensions 74 to the upright upper extended positions and the extensions 74 are outwardly and downwardly swingable toward lowered inverted positioned disposed outwardly of and alongside the sections 24. In addition, the section 26 includes an extension 86 which is similar to the extensions 74, but the extensions 86 are pivotally secured by fasteners 88 to the legs 68 inwardly of the members 36 and are thus swingable from the upright extended positions inwardly and downwardly to the lowered inverted positions.

Suitable fasteners 89 are secured through adjacent ends of the extensions 74 and 86 in order to retain the latter in their upright upper positions and the partial end sections 42 include extensions 90 which are similar to the extensions 74 and are supported from the end sections 42 for swinging relative thereto by means of fasteners 92, the sections 90 being outwardly and downwardly swingable to their inverted lowered positions.

Although the lower marginal edges of the side sections 24 and the end section 26 may closely overlie the inner marginal portions of the upper marginal edges of the side and end walls 14 and 16 of the load bed 12, the weight of the stock rack 22 is supported at its forward end by means of the leg assembly 66 from the floor 18 and by the partial end wall sections 42 and the channel member 62 at its rear end. Accordingly, if the remote marginal edge of the partial end wall sections 42 closely abut the inner sides of the rear ends of the side walls 14 and the opposite ends of the horizontal member 70 closely abut the inner sides of the forward ends of the side walls 14, the stock rack 22 may be supported from the load bed 12 in the desired position relative thereto but spaced, at least slightly, from the upper marginal edges of the side and end walls 14 and 16 thereby preventing the side and end walls 14 and 16 from being marred.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A stock rack for a pickup truck load bed of the type including opposite side walls interconnected at their forward ends by means of a transverse front wall, said rack including opposite side and front sections for disposition in upstanding position extending along and projecting upwardly from the upper marginal edge portions of said side and front walls, said front section extending between and being secured to the forward ends of said opposite side sections, said side and front sections each including an extension supported therefrom for swinging about an axis paralleling the upper marginal edge of the corresponding section between a lowered inverted position disposed alongside and generally paralleling the corresponding section and a raised upright and upstanding upper position forming an upward extension of the corresponding section, said side and end section extensions being disposed along the outer and inner sides of the corresponding sections, respectively, when in the lowered inverted positions, said stock rack including a pair of opposite side partial end wall sections supported and projecting inwardly from the rear ends of said side sections toward each other and including horizontally spaced upstanding adjacent edge portions, and a gate member removably supported in position spanning and closing the space between said adjacent edge portions, said partial end wall sections extending downwardly below the lower marginal portions of said side sections for support from the floor of said load bed at the rear marginal portion thereof.

2. The combination of claim 1 wherein said sections and the corresponding extensions include coacting vertically overlapped and horizontally abuttingly engageable portions limiting swinging movement of said extensions relative to said sections to said lowered and upper positions thereof from said upper and lowered positions, respectively.

3. The combination of claim 2 wherein the adjacent ends of said side and end extensions include coacting means adapting said extensions for stationary securement to each other in said upper positions.

4. The combination of claim 1, wherein each of said sections and extensions includes a plurality of crossed and rigidly interconnected horizontally and vertically spaced upright horizontal members, respectively.

5. The combination of claim 1 wherein said front section includes an inwardly offset and depending leg assembly whose lower end is adapted to abut against the upper surface of the forward end of the floor of said load bed interconnecting the lower marginal portions of the opposite side and end walls of said load bed.

6. The combination of claim 1 including a lower horizontal member extending between and interconnecting the lower marginal edge portions of said end wall sections.

7. The combination of claim 6 wherein said adjacent edge portions include means defining opposing upstanding channels, said gate member being vertically slidable in and supported from said channels.

8. The combination of claim 7 wherein said partial end wall sections each also include an extension swingably supported therefrom for movement between an upper upwardly projecting position and a lowered inverted position disposed alongside and generally paralleling the corresponding end wall section.

9. The combination of claim 8 wherein said end wall extensions are disposed along the outer sides of said end wall sections when in the inverted positions.

* * * * *